Patented Mar. 12, 1946

2,396,465

UNITED STATES PATENT OFFICE 2,396,465

PREPARATION OF SODIUM ARSENITE

Errol Hay Karr, Tacoma, Wash., assignor to The Pennsylvania Salt Manufacturing Company, Philadelphia, Pa., a corporation of Pennsylvania No Drawing. Application October 12, 1943, Serial No. 506,007

3 Claims. (Cl. 23—53)

This invention relates to the production of high arsenic content water soluble, alkali metal arsenites, and more particularly, it relates to an improved method of causing a controlled reaction between an alkali metal hydroxide and arsenic trioxide to obtain a granular product in a one-step operation.

It is known that solid sodium arsenite can be prepared by mixing together powdered solid caustic soda and arsenic oxide in a heap and initiating the reaction by adding a small quantity of water. Ullmann's Encyclopedia der Techn. Chemie., volume I, page 588. This method will yield a solid material but it is attended by several disadvantages.

Preparing solid sub-divided caustic alkali requires special pulverizing equipment since such alkalies as sodium or potassium hydroxides readily absorb moisture from the atmosphere and in dust form are extremely irritating. Mixing of solid sub-divided caustic alkali with powdered arsenic trioxide causes loss of material as an irritating and poisonous dust. A dry mixture of this kind can be caused to react in either two ways—by applying heat or water. To apply heat to the dry mixture of arsenic trioxide and sub-divided alkali causes a violent and sudden reaction which in the case of producing high arsenic content alkali metal arsenites leaves some unreacted arsenic trioxide. Lack of control in causing the vigorous reaction to spread intimately through the dry mass is a drawback and during such violent eruption some of the dry mixture is forced off as a fine dust. To cause a reaction between the alkali and arsenic trioxide in a heap by the addition of water yields a product which is not uniform throughout its mass and which will either contain too much or too little water, yielding anywhere from a thick syrupy or semi-solid substance to a hard cement-like mass on cooling.

The product, of the prior art, is obtained in a variety of forms, depending upon the quantity of water added to the dry mixture of alkali and arsenic trioxide to initiate the reaction, the size of the mixture heap, the temperature of the surrounding atmosphere, etc. Since additional water is formed during the reaction, any solid mass obtained will usually contain sufficient water to render it sticky and difficult to handle. Even if this material is first heated, it is still necessary to crush it to produce a granular product.

An object of the invention is to provide a method of preparing high arsenic content alkali metal arsenites from alkali metal hydroxide and arsenic trioxide without the necessity of using the alkali metal hydroxide in powder form.

Another object of the invention is to provide a cheap and easily performed process for the preparation of alkali metal arsenites from concentrated solutions of caustic alkali and powdered arsenic trioxide in standard mixing equipment.

An additional object of the invention is to provide a process for obtaining alkali metal arsenites in granular form from concentrated solutions of caustic alkali and powdered arsenic trioxide.

A further object of the invention is to provide a process for the preparation of granular alkali metal arsenites, e. g. sodium arsenite, by the interaction of concentrated solutions of caustic alkali and powdered arsenic trioxide with substantial elimination of dust formation through avoiding dry mixing of ingredients and in addition, safeguarding against insufficient or over-violent reactions by bringing the ingredients together under specified conditions.

A still further object of the invention is to provide a process which will yield a dry, water-soluble, granular alkali metal arsenite product containing a high percentage of trivalent arsenic and having a low water content.

Another object of the invention is to provide a process wherein prolonged digestion of arsenic trioxide in dilute alkali metal hydroxides is avoided with a resultant saving of considerable heat ordinarily required to form the alkali metal arsenite and to evaporate the excess water present to form a dry solid.

Other objects and advantages will be apparent from a study of this specification and claims.

This invention is based upon the concept that the reaction between caustic alkali and arsenic trioxide should take place in the shortest possible time in the presence of a quantity of water so limited that the reaction heat accumulated will drive off sufficient water to enable the formation of a completely-reacted, granular material, in the mixer, in a one-step operation.

Since the alkali metal arsenite which is most commonly employed is sodium arsenite, the invention will be described in connection with its preparation.

According to the invention a weighed amount of arsenic trioxide is uniformly distributed in the bottom of a mixer equipped with a suitable agitator. A corresponding amount of a hot concentrated solution of sodium hydroxide is then introduced into the mixer on top of the arsenic trioxide. The hot sodium hydroxide solution will lie quietly on the arsenic trioxide if undisturbed. To cause the reaction, the agitator blades are set into motion when a vigorous reaction occurs. The heat of the reaction expels a substantial part of the total water present, including water formed by the reaction. The vigorous reaction takes about 15 to 30 seconds to subside, and after about 5 to 10 minutes of continued agitation, a granular product is obtained.

The fact that the hot sodium hydroxide solution will lie quietly, on the arsenic trioxide, until all of it has been added and the layers disturbed, is an important feature of the invention since it allows the reaction to be started suddenly after all the necessary quantities of the reactants have been brought together, resulting in simultaneous reaction throughout the entire mass with liberation of sufficient heat to expel a quantity of water such that a granular material will be formed.

The quantity of water present during the reaction is an important factor. Sufficient water should be present to bring about a controllable, vigorous reaction. With low quantities of water, approaching anhydrous molten caustic soda, the reaction is difficult to control and a uniform reaction throughout the mass is difficult to obtain. At the same time, the quantity of water employed is so limited that the heat of reaction will expel sufficient water vapor to yield a granular product.

Control of the quantity of water added will determine the degree of rapidity and extent of reaction at various temperatures and, therefore, the quantity of heat liberated. The sodium hydroxide solutions employed will contain not more than about 40% of water and usually not more than about 30% of water will be present, in the sodium hydroxide solution employed, when a dry granular product is desired. As stated, as anhydrous molten sodium hydroxide is approached, the violence of the reaction and the difficulty of controlling it increases, and for this reason, it is preferred to employ solutions having a concentration within the range of about 60% to about 80% NaOH.

The temperature of the sodium hydroxide employed will be about 175° C. although somewhat higher temperatures may be employed. The violence of the reaction will increase with increase in temperature. A temperature in the range of about 165° C. to about 195° C. is preferred, but a slightly higher temperature, say up to about 230° C., can be employed.

In general, the concentration and temperature of the sodium hydroxide solution added will be selected so that the quantity of water added will not exceed the quantity that can be expelled by the heat of reaction.

The invention is particularly adapted to the preparation of sodium arsenites having a molecular ratio of $Na_2O$ to $As_2O_3$ of from about 0.8:1 to about 1:2.

The following examples will serve to more fully illustrate the invention:

Example 1

300 pounds of white arsenic trioxide (99%) were placed in the bottom of a mixer (of the type used for mixing mortar, equipped with a ventilating hood). A hot solution, consisting of 80 pounds of sodium hydroxide and 34 pounds of water, was quickly added to the mixer. The agitator (shaft turns 4 R. P. M.) was started and a vigorous reaction followed which subsided in about 20 seconds. A damp, granular mass, containing about 10% of water, was obtained.

The damp, granular substance was dried by passing a current of hot gases from an oil burner into the mixer for a period of 60 minutes, with the agitators in operation. The temperature of the hot gases at the injection point varied between 200° C. and 250° C. The dried substance obtained contained 2%–3% of water and on grinding in a suitable mill, produced a white powder.

Laboratory tests showed that the powdered product contained not less than 80 percent of $As_2O_3$ as arsenite in water-soluble form.

Example 2

The same procedure, as described in Example 1, was employed to cause the reaction between 200 pounds of white arsenic trioxide and 65 pounds of sodium hydroxide in 25 pounds of water.

The dry powdered product obtained contained not less than 76% of $As_2O_3$ as arsenite in the water-soluble form. This product was quickly soluble in water and gave clear, light amber solutions, free from any noticeable amount of insolubles.

The essence of the invention is that the quantity of water is so limited and the reactants are so brought into presence of each other that a sudden evolution of heat is caused to occur; thus yielding a solid, granular product in a one-step operation, avoiding cumbersome, lengthy, and expensive evaporation with the subsequent necessary crushing and handling operations.

I claim:

1. A process for the preparation of a granular, sodium arsenite product by the interaction of sodium hydroxide and arsenic trioxide which comprises placing arsenic trioxide into a mixing vessel; then adding a preheated concentrated solution of sodium hydroxide to said arsenic trioxide, in said mixer, in a proportion such that the molecular ratio of $Na_2O$ to $As_2O_3$ of the final mixture will be from 0.8:1 to 1:2; then setting said mixer into motion and continuing the mixing of the mixer contents to produce a solid material in granular form.

2. The process of claim 1 wherein the concentration of the sodium hydroxide solution lies in the range of from about 60% to about 80% by weight; and wherein the sodium hydroxide solution is preheated to a temperature within the range of from 165° C. to 230° C.

3. A process for the preparation of a high arsenic containing water soluble, granular sodium arsenite product by the interaction of sodium hydroxide and arsenic trioxide, which comprises placing arsenic trioxide into a mixing vessel; then adding a preheated approximately 70% sodium hydroxide solution to said arsenic trioxide in said mixer in a proportion such that the molecular ratio of $Na_2O$ to $As_2O_3$ in the final mixture will be from 0.8:1 to 1:2; the temperature of the sodium hydroxide solution being within the range of 175° C.–195° C.; and then setting said mixer into motion and continuing the mixing of the mixer contents to produce a solid material in granular form.

ERROL HAY KARR.